(12) United States Patent
Pivin et al.

(10) Patent No.: US 12,330,112 B2
(45) Date of Patent: Jun. 17, 2025

(54) FILTERING BYPRODUCTS OF CIPP INSTALLATION

(71) Applicant: INA Acquisition Corp., Wilmington, DE (US)

(72) Inventors: Dennis Pivin, St. Louis, MO (US); Kurt Schlake, St. Louis, MO (US); Michael Shrum, St. Louis, MO (US)

(73) Assignee: INA Acquisition Corp., Wilmington, DE (US)

( * ) Notice: Subject to any disclaimer, the term of this patent is extended or adjusted under 35 U.S.C. 154(b) by 273 days.

(21) Appl. No.: 17/856,738

(22) Filed: Jul. 1, 2022

(65) Prior Publication Data

US 2023/0001344 A1   Jan. 5, 2023

Related U.S. Application Data

(60) Provisional application No. 63/217,821, filed on Jul. 2, 2021.

(51) Int. Cl.
| | |
|---|---|
| *B01D 53/04* | (2006.01) |
| *B01D 53/26* | (2006.01) |
| *B29C 63/00* | (2006.01) |
| *B29C 63/34* | (2006.01) |
| *F16L 55/165* | (2006.01) |
| *B29L 23/00* | (2006.01) |

(52) U.S. Cl.
CPC ..... *B01D 53/0415* (2013.01); *B01D 53/0446* (2013.01); *B01D 53/0454* (2013.01); *B01D 53/265* (2013.01); *B29C 63/0004* (2013.01); *B29C 63/0069* (2013.01); *B29C 63/34* (2013.01); *F16L 55/1654* (2013.01); *B01D 2257/708* (2013.01); *B29L 2023/22* (2013.01)

(58) Field of Classification Search
CPC ............ B01D 53/0415; B01D 53/0446; B01D 53/0454; B01D 53/265; B01D 2257/708; B29C 63/0069; B29C 63/34; F16F 55/1654

See application file for complete search history.

(56) References Cited

U.S. PATENT DOCUMENTS

2021/0102655 A1   4/2021  Whelton et al.
2021/0317940 A1*  10/2021 Kiest, Jr. ............. F16L 55/1652

FOREIGN PATENT DOCUMENTS

KR          102231589 B1 *  3/2021

* cited by examiner

*Primary Examiner* — Daniel McNally
(74) *Attorney, Agent, or Firm* — Stinson LLP (57) ABSTRACT

A system and method for capturing volatile organic components from a liner curing process for pipes. The system receives steam exhausted from the liner. The steam is used for curing a curable material in the liner, but volatilizes organic components in the resin carried along with the steam. The system removes some water and passes the remaining vaporized constituents through a filter selected to capture the particular volatile organic component from the steam.

6 Claims, 8 Drawing Sheets

FILTERING BYPRODUCTS OF CIPP INSTALLATION

BACKGROUND

This invention relates generally to filtering of byproducts of cured-in-place pipe (CIPP) installation, and more particularly to an apparatus and method for reducing vaporized styrene from a steam cured CIPP installation.

Cured in place pipe liner systems typically employ a liner that is a material capable of carrying a resin. The liner impregnated with uncured resin can be positioned within, for example, a pipe to be repaired. Once in place, the resin in the liner can be induced to harden (i.e., "cured"), producing a strong and rigid pipe within the host pipe. A common way to initiate the chemical reaction causing the liner to harden is to introduce steam into the interior of the liner once it has been positioned in the host pipe. The steam passes through the interior of the liner providing energy to initiate the curing reaction, and then is exhausted from the interior of the liner. In this way, a pipe can be repaired (often more than once) rather than replaced. The life of the pipe before it has to be dug up (for pipes located underground) and replaced is greatly lengthened. Many resins contain a styrene component, which can be broadly be considered a volatile organic component ("VOC"). The steam exhausted from the liner may contain some of the VOC, as a byproduct of the operation. While it has not been shown that a VOC present in resins commonly used is a threat to persons or to the environment, in the case of styrene there is a noticeable odor that can be offensive to persons who may be living the area where the pipe repair is being carried out. It is known to collect exhausted steam in the form of water, and then to process the water to remove the VOC. However, this may require processing many thousands of gallons of water, and is a delay and an expense over and above the cost of installing the cured in place pipe liner.

DRAWING DESCRIPTION

Corresponding reference characters indicate corresponding parts throughout the several view of the drawings.

DESCRIPTION

Figure 1:
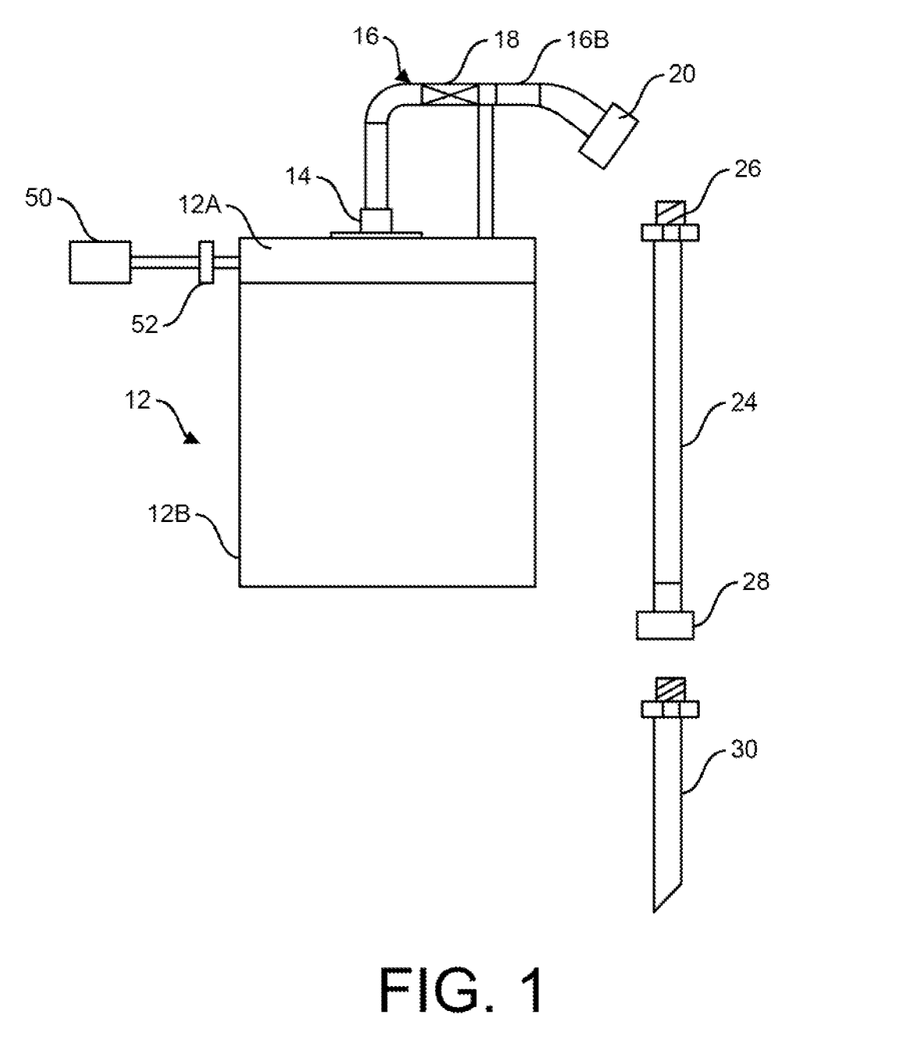
FIG. 1 is a schematic left side elevation, partially exploded of a filter assembly.

A filtering system for use with cured in place pipe shown below in FIG. 1 is generally indicated by reference numeral 10. This system includes a carbon filter canister, indicated generally at 12, that includes carbon selected to capture the volatile organic component ("VOC"). Although carbon is the preferred filter material, other materials may be used within the scope of the present invention. The canister 12 has an inlet opening at its top that is covered by a fitting 14. Wheels 15 on the bottom of the canister 12 allow the canister to be moved more easily around a work site. In the illustrated embodiment, the fitting includes a twelve inch round plate that covers the inlet opening. A smaller (e.g., 2 inch) inlet conduit 16 passing through the fitting 14 to the opening in the canister 12 communicates steam into the canister. A first section 16A of the inlet conduit 16 extends up from the fitting 14 to a valve 18. The valve is a ball valve, but any suitable valve or flow control apparatus can be used. The ball valve 18 may be used to control the back pressure on the steam in a CIPP liner (not shown) that has been installed in a host pipe and is being subject to a curing process in which steam is injected into the liner. The valve 18 may also be used to regulate the amount of steam passing into the carbon filter canister 12. A second section 16B of the inlet conduit 16 extends from the ball valve 18 to a connector 20. A bracket 22 holds the inlet conduit 16 (including the first section 16A, the second section 16B and the ball valve 18) in place with respect to the carbon filter canister 12.

A steam hose 24 has a first fitting 26 at one end that can be sealingly connected to the connector 20 of the inlet conduit 16. The steam hose 24 can have a length as required to extend from the liner, which may be underground, to the location of the carbon filter canister 12. A second fitting 28 on an opposite end of the steam hose 24 opposite the first fitting 26 can be connected to a stinger 30 (broadly, "a liner coupler") that can be inserted into the liner to communicate with the interior of the liner. The stinger 30 is inserted into the liner at an end which is the downstream end of the liner, opposite the end where steam is introduced into the liner. As shown, the stinger 30 can be detached from the steam hose 24, but any suitable construction of the steam hose and stinger is permissible. The stinger 30, steam hose 24 and inlet conduit 16 (including the ball valve 18) may be considered an "exhaust conduit" for purposes of the present description.

Figure 2:
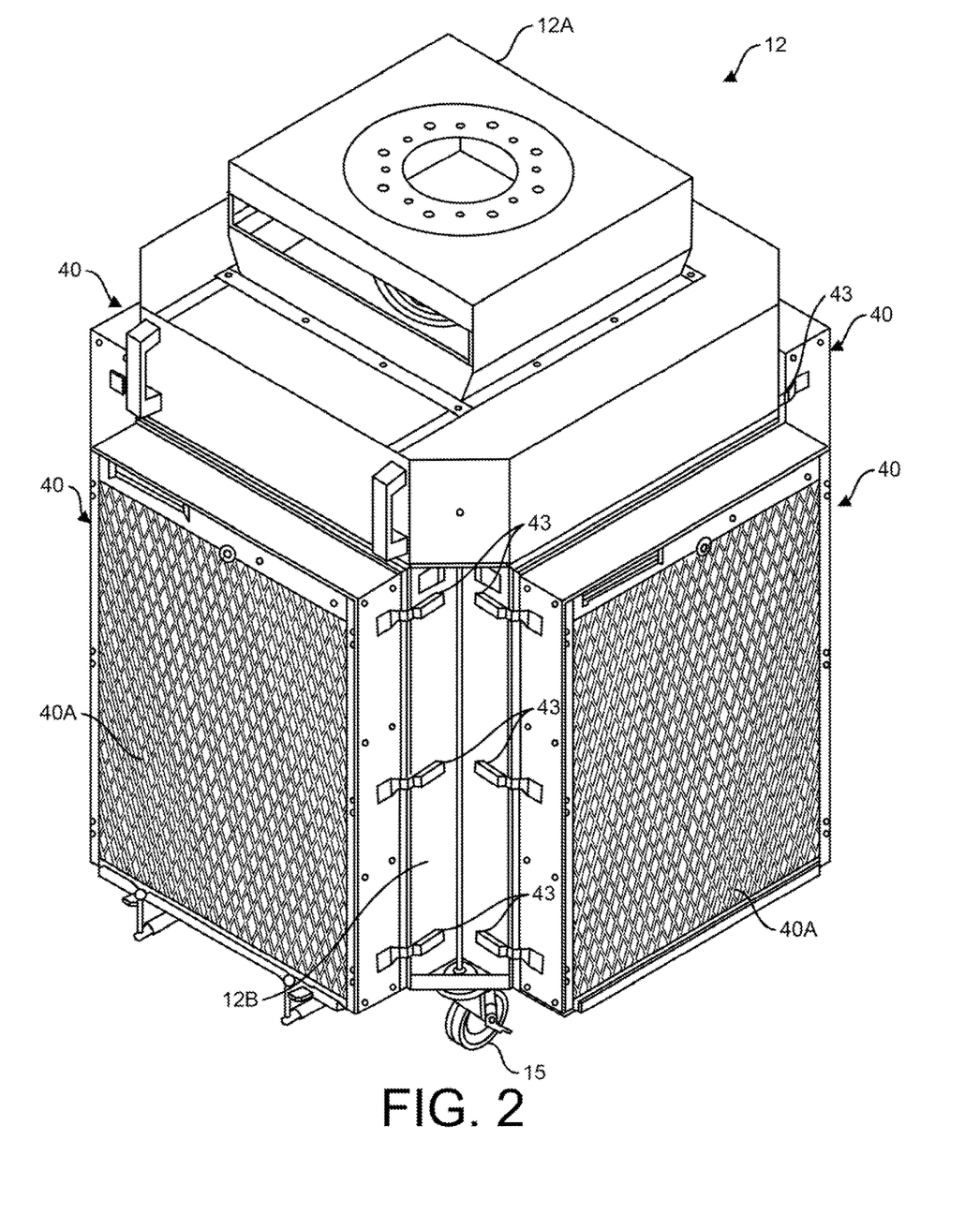
FIG. 2 is a perspective of a carbon filter canister of the filter assembly.

The carbon filter canister 12 is shown in FIG. 2 without any of the plumbing used to attach the canister to the CIPP liner. The canister 12 has an upper housing 12A that defines an internal volume. In the drawings, portions of two of the side of the upper housing 12A have rectangular sections broken away to show internal construction. The upper housing 12A includes internal baffling (not shown) to break up the stream of exhaust steam entering the upper housing. The baffling can give the exhaust steam some lateral component of motion as it enters a lower housing 12B of the carbon filter canister 12. The upper housing 12A further includes an open top through which the exhaust steam is received from the inlet conduit 16. The steam flows down from the upper housing 12A into the lower housing 12B of the canister 12 and then outward through openings in the four sides.

Figure 3:
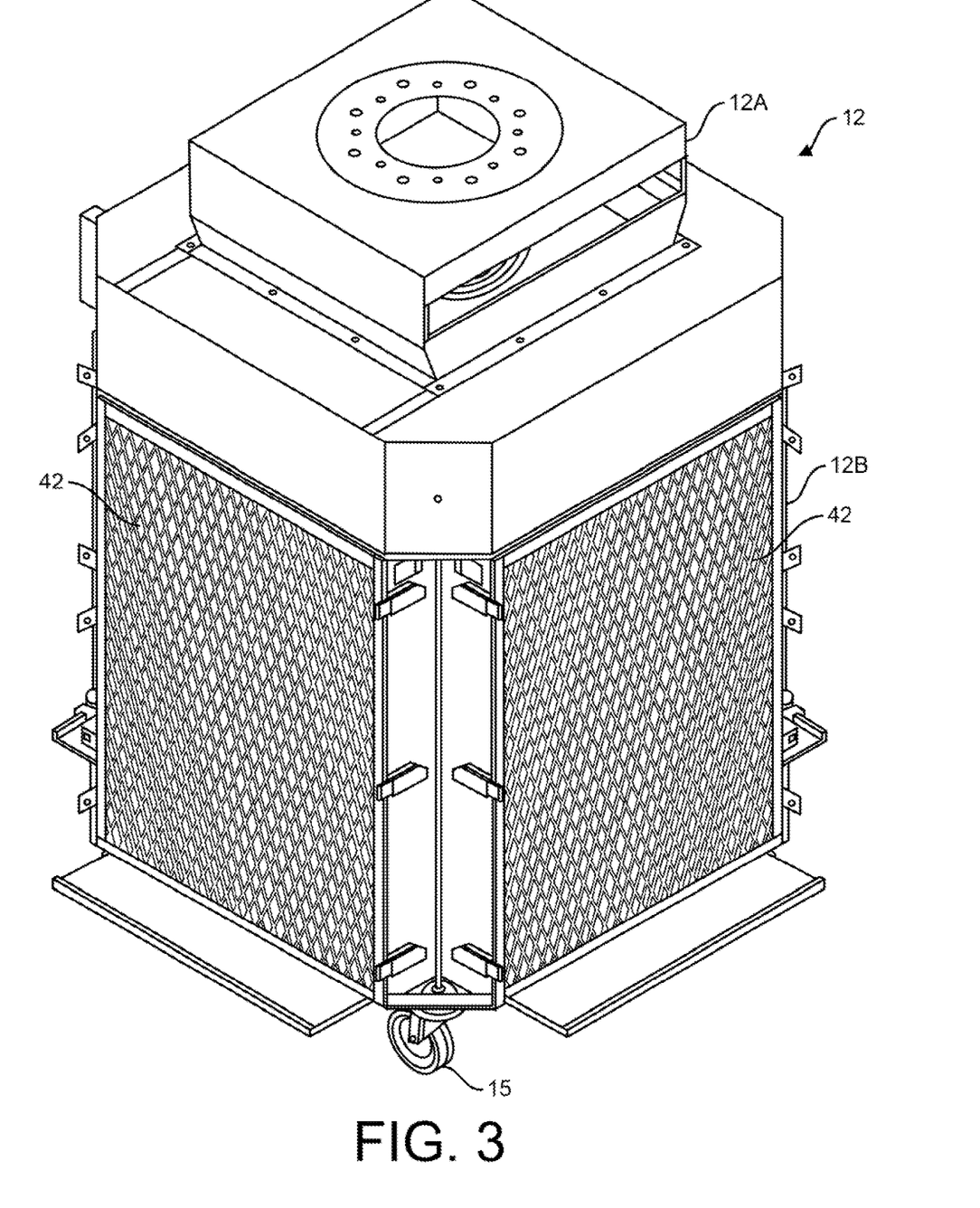
FIG. 3 is a perspective of the carbon filter canister with carbon filter panels removed.

Each of the four sides has a carbon filter panel, indicated generally at 40 so that gas exiting the carbon filter canister 12 must pass through one of the filter panels before it reaches the environment. The carbon filter panels 40 comprise activated carbon filters covered on the outside by a mesh screen 40A made of a suitable material such as aluminum. The mesh screen 40A holds the carbon filter material in the panel 40. Other configurations for the carbon filters is possible. For example, and without limitation, the carbon filters could be tubular in shape. Two or more carbon filter tubes could be concentrically placed to achieve the desired level of filtering. The lower housing 12B would be reconfigured to removably receive the carbon tubes instead of the panels 40. Activated carbon attracts and holds organic chemicals from vapor streams. In the illustrated embodiment, the activated carbon is a blend made from lignite coal, bituminous coal and coconut shell, and performs wall in the capture of styrene from a vapor stream. More specifically, the carbon blend is selected to fit the molecular weight and polarity of styrene in the exhaust steam. As may be seen in FIG. 3 showing the carbon filter panels 40 removed from the canister 12, the openings in each the sides of the canister are covered by a respective mesh screen 42. The mesh screen may be made of a suitable material, such as polypropylene. The steam must pass through these screens 42 before reaching the carbon filter panels 40. The screens 42 help to remove water from the gas to reduce water contact with the carbon in the carbon filter panels. The carbon filter panels 40 can be removed to facilitate replacement. In the illustrated embodiment, buckles 43 are provided for connecting the carbon filter panels 40 to the lower housing 12B. At least one of the panels 40 and the lower housing 12B includes gasketing to assure a sealing connection between the panels and the lower housing.

Figure 4:
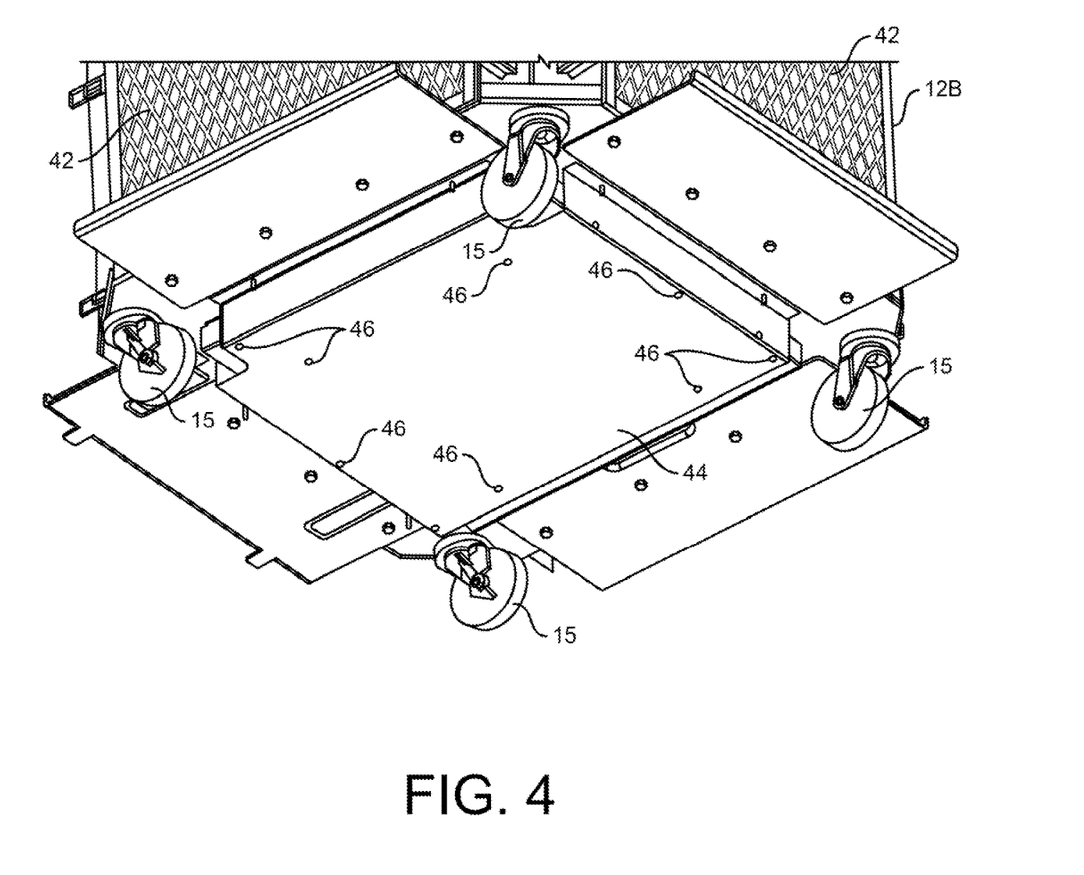
FIG. 4 is a fragmentary, bottom perspective of the carbon filter canister of FIG. 3, showing openings for draining water from the canister.
Figure 5:
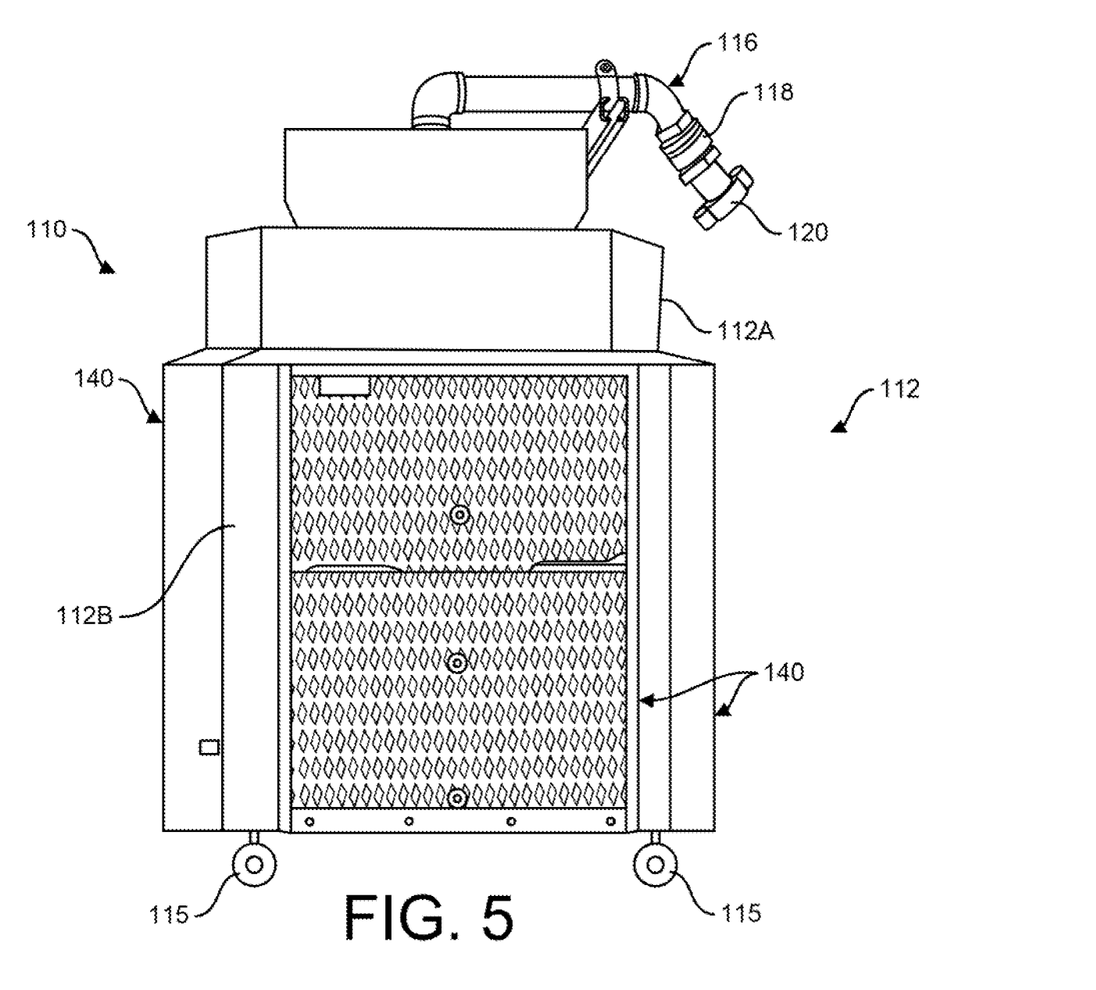
FIG. 5 is a left side photograph of a carbon filter canister.
Figure 6:
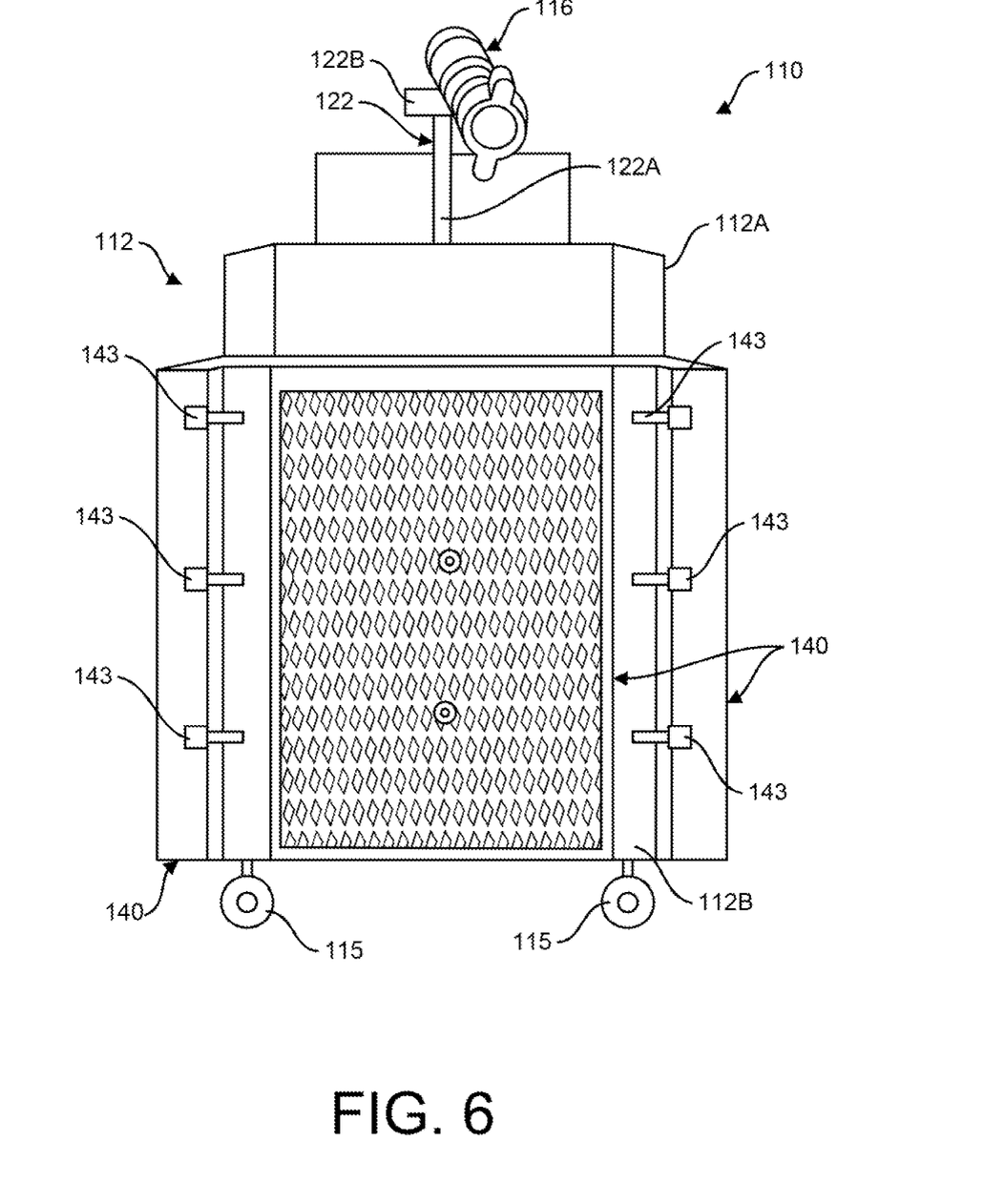
FIG. 6 is a front side photograph of the carbon filter canister of FIG. 5.
Figure 7:
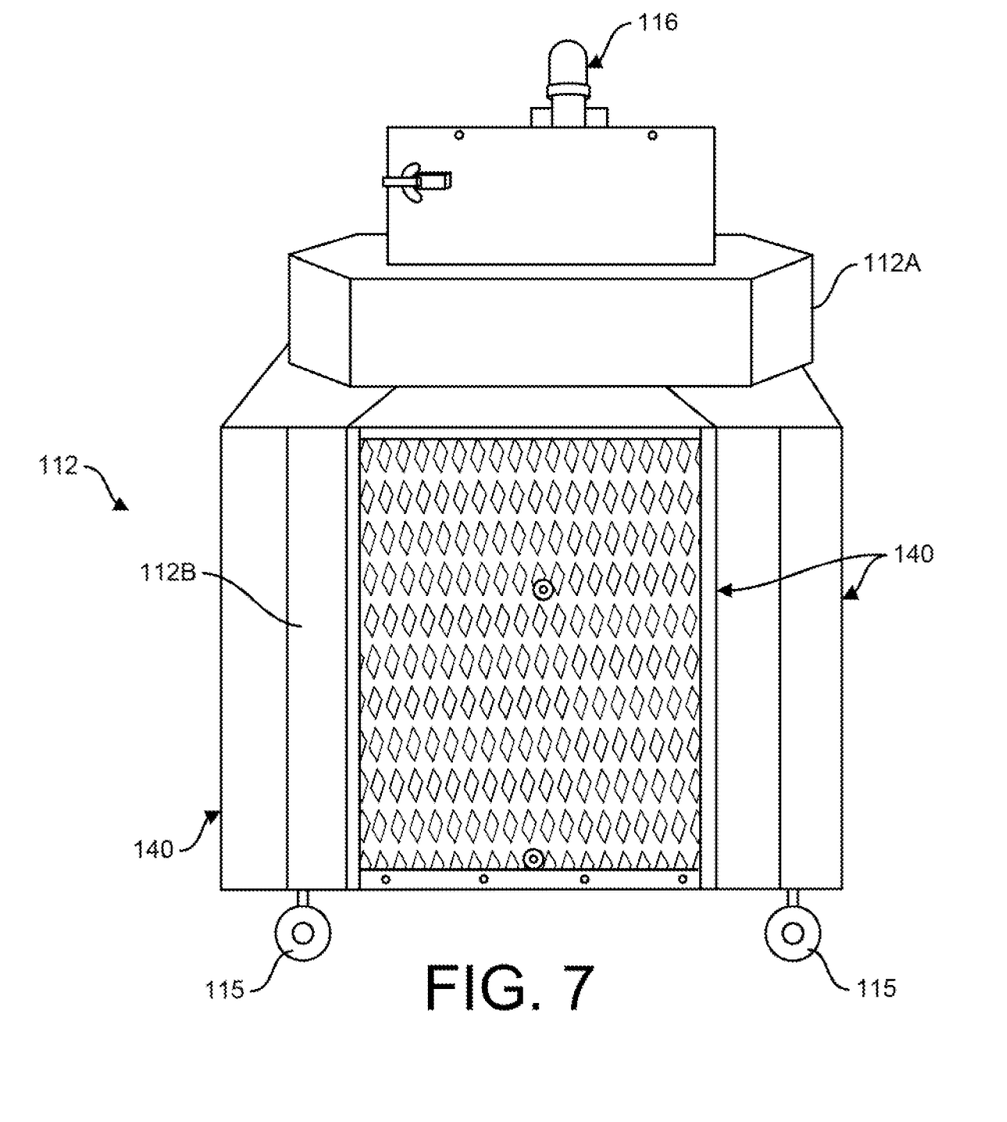
FIG. 7 is a back side photograph thereof.
Figure 8:
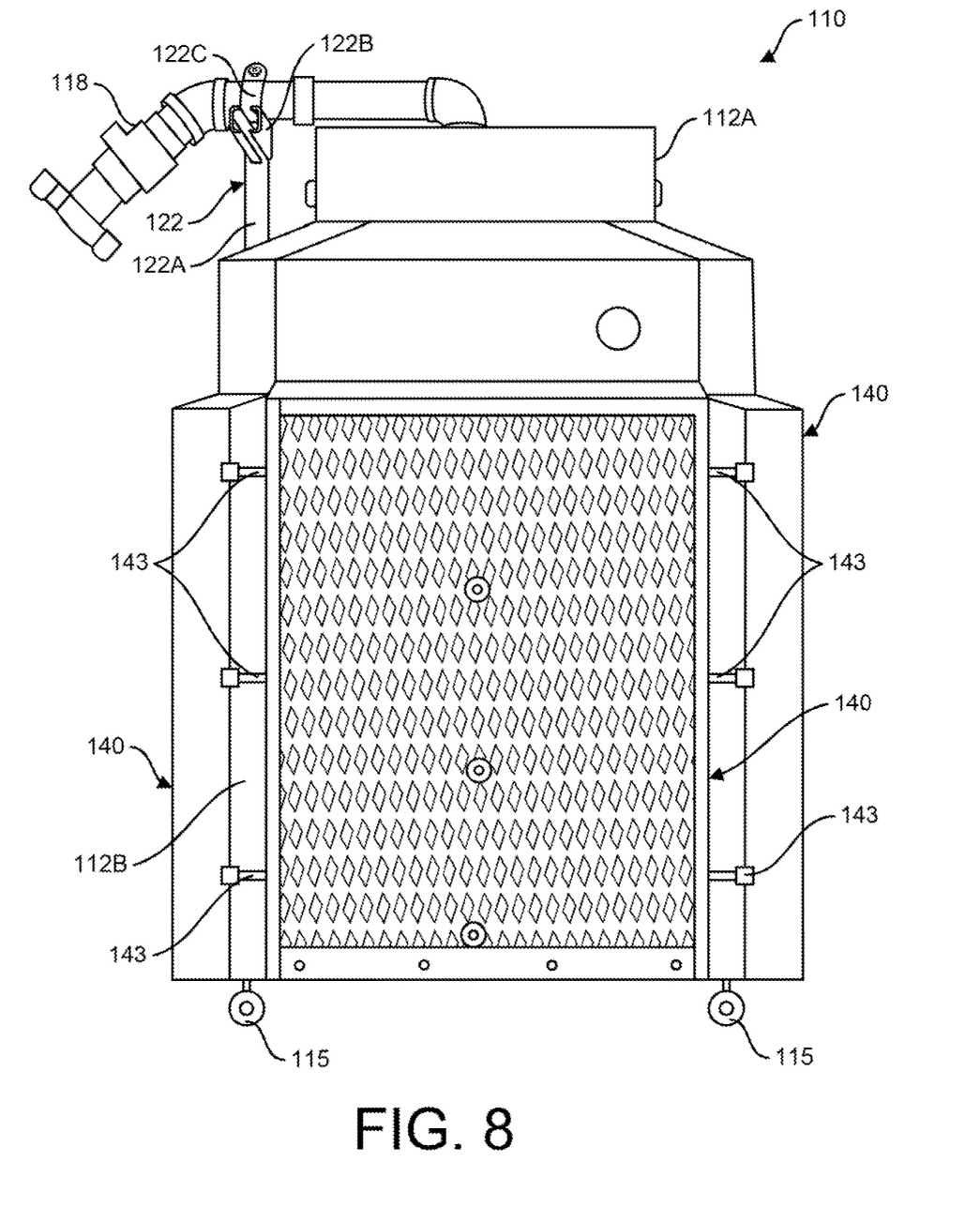
FIG. 8 is a right side photograph thereof.

As shown in FIG. 4, the bottom of the canister 12 includes a tray 44 the collects water from the steam fed into the canister. The tray has holes 46 in it which permit water condensed from the steam to pass out of the canister. The holes 46 may release water directly to the environment or to a holding container (not shown).

Referring again to FIG. 1, in order to monitor the level of VOC in the carbon filter canister 12, a PID sensor 50 (or other suitable sensor) may be provided. In one embodiment, the sensor 50 is arranged so that it can detect levels of VOC in the canister. If the level exceeds a certain predetermined amount, the sensor 50 can be configured to provide an indication of that event. In other embodiment, the sensor 50 may be able to cause the carbon filter system 10 to stop processing exhaust steam and, for example, shunt condensed steam to a collection area for later treatment. The sensor 50 for detecting VOC may be sensitive to water. Accordingly, in one embodiment, a filter 52 preventing entry of water or water vapor into the sensor 50 may be used.

FIGS. 5-8 show another constructed version of a filtering system 110. The construction is closely similar to what is shown in FIGS. 1-4. Therefore, corresponding parts are given the same reference numerals, plus "100." It is noted that the ball valve 118 is located nearer to the end of the inlet conduit 116 farthest from its connection to the carbon filter canister 112, rather than between two sections of the inlet conduit as shown in FIG. 1. As may be best seen in FIGS. 6 and 8, the bracket 122 includes a stanchion 122A mounted on the carbon filter canister 112, and a cross bar 122B attached to the top of the stanchion. A clamp 122C mounted on the cross bar 122B attaches and holds the inlet conduit 116 to the bracket 122. The bracket also stabilizes the inlet conduit 116 with respect to the carbon filter canister 112.

The filter system of the present invention allows steam which may contain a VOC to be processed simultaneously with the curing of the liner. In one embodiment, the water that results from the filtered steam and be immediately released to the environment. The water from the carbon filter canister can be collected in a drip pan (not shown) at the bottom of the canister and then released.

In use, a liner made of an absorbent material can be saturated with a curable resin (broadly, "a curable material") in liquid form. The liner can be installed into a host pipe in need of repair. Typically, the host pipe will be prepared by cleaning prior to installation of the liner. The liner can then be placed into the pipe in a suitable fashion, such as by everting the liner into the pipe and dragging the liner into the pipe. Initially, the liner has the shape of a flattened tube.

Once in place in the pipe, the liner closed off at its remote end and is inflated into a roughly tubular shape so that the liner substantially conforms to the walls of the host pipe and defines a new passageway within the pipe for liquids to be transported. The liner is cured so that the resin carried by the liner hardens so that it holds itself in a fixed tubular shape. In this way, an essentially new pipe is formed within the host pipe, giving the pipe a substantially extended life.

A common way to induce curing of the resin in the liner is to introduce steam into the liner so that the steam flows along the full length of the liner. A restricted orifice is provided at the end of the liner opposite the end where the steam is introduced so that the steam may exit the liner, but some backpressure is maintained so that heat from the steam is absorbed by the resin, causing it to cure. One way to allow steam to escape is to insert a stinger 30 through a wall of the liner so that an open free end of the stinger is inside the liner and exposed to the steam under pressure. Other ways of allowing the steam to exit the liner, such as a saddle vent (not shown) may be used in place of the stinger. The saddle vent (broadly, "a liner coupler") may include a metal plate formed to engage a side of the liner. A threaded tube is mounted on the metal plate and extends through an opening in the plate. One or more ratchet straps attached to the plate can be extended around the liner near the end of the run of the liner to secure the saddle vent in place. Prior to placing the metal plate against the liner, felt material (not shown) is wrapped around the liner and the metal plate of the saddle vent is placed against the felt material on the liner. Tightening the ratchet straps forces the plate and threaded tube down against the felt and the underlying liner. A drill can be inserted down the threaded tube and cut through the liner. The threaded tube project through the liner. The felt material is urged against the threaded tube around the opening in the liner so that the saddle vent is sealed with the liner. Therefore, exhaust steam leaving the liner passes into the steam hose 24 connected to the threaded tube and not into the environment. Saddle vents of the type described herein are shown and described in co-assigned U.S. Pat. No. 8,083,975, the entire contents of which are incorporated herein by reference.

Steam leaving the liner through the stinger 30 carries with it a quantity of vaporized styrene. It will be understood that the heat of the steam causes some of the styrene in the resin to be vaporized and mixed in with the steam. The exhaust steam travels along the steam hose 24 to the inlet conduit 16. The exhaust steam passes through the open ball valve 18 and into the interior of the carbon filter canister 12. The steam under pressure is forced through the carbon filter panels 40. However, first the steam passes through the mesh screen 42, which tends to force some of the water out of the steam. The water flows down into the tray 44 where it can be collected or released to the environment or some other holding container. The styrene remains largely in vapor form and passes through the mesh screens 42 and into the carbon filter panels 40. The carbon filters capture a large majority of the styrene so that the amount of styrene in the exhaust steam leaving the carbon filter panels 40 has been measured to be 70% to 85% less than the amount of steam entering the carbon filter canister 12. The range can be understood as being dependent upon the diameter of the liner being cured, the initial styrene concentration, etc.

Some of the exhaust steam entering the carbon filter canister 12 is diverted through filter 52 to remove water, and then to the sensor 50. The sensor measures the styrene content of the incoming exhaust gas. The ball valve 18 can be used to control the amount of exhaust steam entering the canister 12 and to control backpressure in the liner. A suitable pressure sensor (not shown) is provided for measuring the pressure of the steam in the liner. In some embodiments, the ball valve 18 is used to control backpressure to about 3 psi when the stinger 30 or saddle vent is being installed. The ball valve 18 is thereafter used to maintain the backpressure at about 7-10 psi to fully inflate the liner and hold the liner open during the steam cure process.

What is claimed is:

1. A method of lining a pipe comprising:
   providing a liner of an absorbent material that is ladened with a curable material;
   installing the liner into the pipe;
   inflating the liner within the pipe so that the liner assumes a generally tubular shape inside the pipe;
   injecting steam into the liner at a temperature which will promote curing of the curable material carried in the liner;
   exhausting steam from the liner;
   passing the exhaust steam from the liner through a filter system including at least one filter selected to capture a volatile organic component in the exhaust steam;
   wherein, prior to passing the exhaust steam from the liner through the filtering system, measuring the concentration of the volatile organic component in the exhaust stream.

2. The method of claim 1 further comprising condensing some of the exhaust steam into water in the filter system prior to the exhaust steam passing through said at least one filter.

3. The method as set forth in claim 2 further comprising collecting some of the condensed exhaust steam in the filter system.

4. The method as set forth in claim 1 further comprising controlling the amount of exhaust steam entering the filter system.

5. The method as set forth in claim 1 further comprising disconnecting the filter system from the liner when the curable material in the liner has been cured.

6. The method as set forth in claim 1 further comprising shunting steam away from the filter system if the measured concentration of the volatile organic component exceeds a predetermined amount.

* * * * *